No. 751,644. PATENTED FEB. 9, 1904.
M. HERZ.
APPARATUS FOR DEVELOPING, WASHING, AND FIXING PHOTOGRAPHIC FILMS.
APPLICATION FILED SEPT. 4, 1903.
NO MODEL.

Witnesses:
James R Bransfield
L. E. Witham

Inventor:
Maximilian Herz
By: Alexander A Dowell
Attorneys.

No. 751,644.

Patented February 9, 1904.

UNITED STATES PATENT OFFICE.

MAXIMILIAN HERZ, OF BERLIN, GERMANY.

APPARATUS FOR DEVELOPING, WASHING, AND FIXING PHOTOGRAPHIC FILMS.

SPECIFICATION forming part of Letters Patent No. 751,644, dated February 9, 1904.

Application filed September 4, 1903. Serial No. 172,018. (No model.)

*To all whom it may concern:*

Be it known that I, MAXIMILIAN HERZ, a subject of the Emperor of Austria-Hungary, residing at Berlin, W. Kurfürstenstrasse 87, in the Kingdom of Prussia and Empire of Germany, have invented certain new and useful Improvements in Apparatus for Developing, Washing, and Fixing Photographic Films, of which the following is a specification.

This invention relates to an apparatus for developing, washing, and fixing photographic films without the use of a dark room.

The apparatus contains a spool or the like upon which is wound the ribbon of film, hereinafter called the "film" for the sake of shortness, with the light-proof paper strip, by which the so-called "daylight-spools" of such films are protected from the injurious action of daylight while being stored and operated upon. The film is wound in such a manner that a hollow space is left between the convolutions of the film, in which space the liquid can circulate that is to act on the photographic surface. This hollow space is made by winding the film on the spool along with two narrow strips (one at each longitudinal side of the film) of suitable flexible material—such as india-rubber, for example.

In the accompanying sheet of drawings the invention is illustrated, by way of example, in which drawings—

Figure 1:
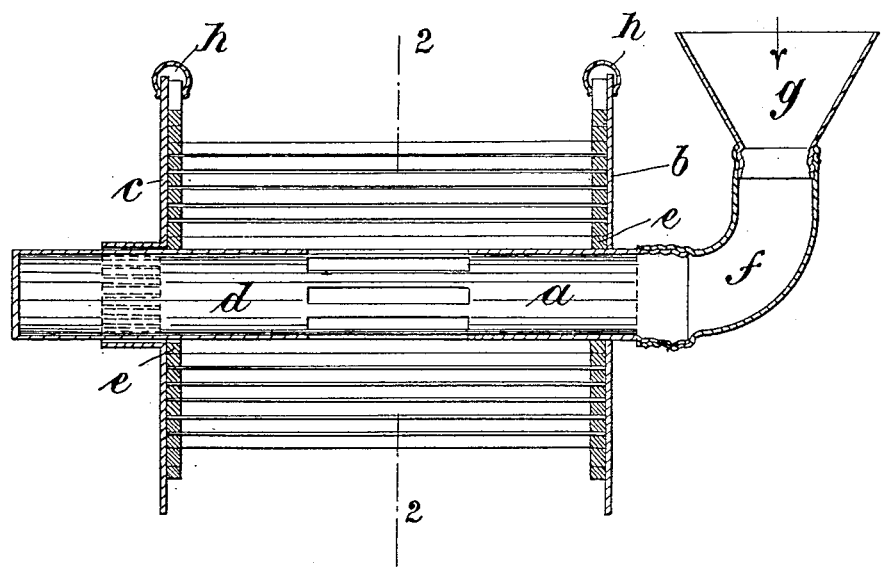
Figure 2:
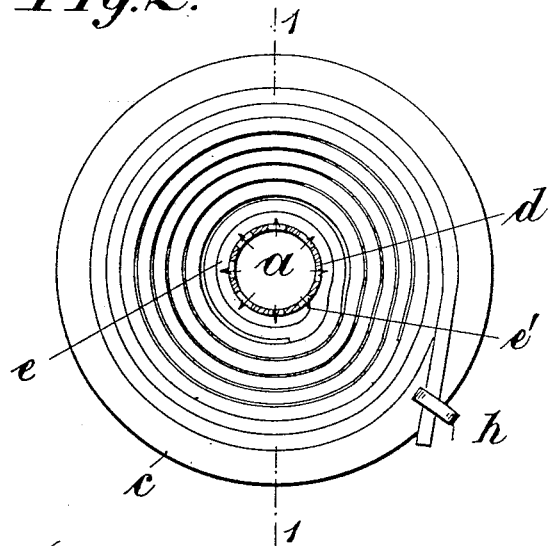

Figure 1 is a longitudinal sectional elevation taken on the line 1 1 of Fig. 2, and Fig. 2 is a cross-sectional elevation taken on the line 2 2 of Fig. 1.

$a$ is the hollow metallic cylindrical core of the spool on which the film is to be wound and is provided with two disks $b$ and $c$, receiving the film between them. One of these disks—$b$, for example—is fixed to the core $a$; but the other, $c$, is movable longitudinally thereon to suit the width of the film. The core $a$ of the spool is furnished with a number of holes $d$. At both ends of the core $a$, just inside the disks $b$ $c$, are the two strips $e$ of flexible material wound water-tight round the core. The strip next to the fixed disk $b$ may be connected with the core by means of suitable adhesive material or otherwise, and the strip next to the adjustable disk $c$ may be connected with the latter by similar means. For fixing the outer ends of these strips after the winding on of the film has been completed clamps $h$ may be employed. To one of the ends of the core $a$ projecting out beyond the spool is connected a flexible tube $f$, on which is mounted a funnel $g$.

The above-described apparatus is used in the following manner: First the adjustable disk $c$ is so placed on the core $a$ that the distance between it and the other disk, $b$, corresponds to the width of the film to be used. The latter is then unwound a little from the exposure-spool in a change-bag, light-proof box, or other suitable apparatus which allows of the use of the hands in it, but excludes light, and the beginning of the partly-unwound film is laid on the two flexible strips $e$ in the position shown at $e'$ in Fig. 2. The film is then unwound from the exposure-spool and wound onto the developing-spool, care being taken that the two flexible strips $e$ come to lie on the outer edges of the film. As the light-proof paper strips that have been unwound from the exposure-spool and wound along with the film on the above-described spool extend considerably beyond the length of the film at both ends, the first part of this operation may in ordinary cases be performed in the daylight. When the winding onto the developing-spool is completed, the outer ends of the strips $e$ are fixed to the disks $b$ $c$ by means of the clamps $h$. By this method of winding up the film a spiral-shaped hollow space is formed between the convolutions of the said film, which space is limited at both sides by the strips $e$. The film is thus excluded from light at the sides by the disks $b$ $c$, while it is sufficiently protected from light at the end by the overlapping end of the light-proof paper strip in which the film is wrapped. The appropriate fluid is now introduced through the funnel $g$, and it runs through the holes $d$ into the spiral-shaped hollow space, where it effects the development, fixing, or washing, as the case may be. When these operations are completed, the film is unrolled and dried.

I do not confine my invention to the exclusive use of light-proof paper strips to prevent the exposure of film-ribbons while being handled, nor to the use of two flexible strips on the edges of the film. For the paper strips may be substituted any other actinic-proof flexible material, and the layers of the films may be separated by other means equivalent to the strips.

What I claim as my invention is—

1. An apparatus for developing, washing and fixing photographic films without a dark room, comprising means for winding up a photographic film in a series of separated layers, means for introducing fluids between the convolutions of the film, means for keeping water-tight the layers of the film, and means for keeping actinic-proof the film when wound up.

2. In an apparatus of the character herein described, the combination of a cylindrical core adapted to receive the windings of the film, and two disks on said core; with means for introducing fluids between the convolutions of the film and means for separating the convolutions of the film.

3. An apparatus of the character herein described, the combination of a tube and a funnel, a hollow core furnished with holes on its circumference, two disks on said core at opposite sides of said holes, and means for separating the layers of a film wound on the core between the disks.

4. An apparatus of the character herein described, comprising a hollow core, closed at one end, open at the other end and furnished with holes on its circumference, two disks on the core at opposite sides of said holes, and means for introducing fluids in the core, and means for separating the layers of a film wound on the core between the disks.

5. An apparatus of the character herein described, comprising a core, a fixed disk thereon and a disk movable along the core, and means for separating the layers of the film wound on the core.

6. An apparatus of the character herein described, the combination of a core adapted to have a film wound thereon, with two strips of flexible material, adapted to separate the layers of the film from one another, and means for introducing fluids between the convolutions of the film.

7. An apparatus of the character herein described, the combination of a core adapted to have a film wound thereon, with two strips of flexible material adapted to be wound between the convolutions of the core, and means for introducing fluid between the convolutions of the film.

8. An apparatus of the character herein described, the combination of a hollow core, two side disks, and two strips of flexible material adapted to be wound with a film between the disk and upon the core.

9. In an apparatus of the character herein described, the combination of a hollow core, and two side disks thereon, with two strips of flexible material, and an actinic-proof paper strip adapted to be wound on the core with the film, substantially as described.

10. An apparatus for developing, washing and fixing photographic films without a dark room, comprising a cylindrical core adapted to receive the film and two narrow strips of flexible material adapted to be laid on the edges of the film as the latter is wound up, substantially as described.

11. In an apparatus of the character herein described, the combination of a core and two narrow strips of flexible material adapted to be wound on the core with a film; with a fixed side disk and a side disk movable along the core, substantially as described.

In testimony whereof I have hereunto set my hand in presence of two witnesses.

MAXIMILIAN HERZ.

Witnesses:
HENRY HASPER,
WILLIAM MAYNER.